(12) United States Patent
Wang (10) Patent No.: US 8,248,527 B2
(45) Date of Patent: Aug. 21, 2012

(54) METHOD AND SYSTEM FOR VIDEO OVERLAY ON FILM DETECTION ON PROGRESSIVE VIDEO INPUT

(75) Inventor: Min Wang, Scarborough (CA)

(73) Assignee: Broadcom Corporation, Irvine, CA (US)

( * ) Notice: Subject to any disclaimer, the term of this patent is extended or adjusted under 35 U.S.C. 154(b) by 387 days.

(21) Appl. No.: 12/544,746

(22) Filed: Aug. 20, 2009

(65) Prior Publication Data

US 2011/0043688 A1    Feb. 24, 2011

(51) Int. Cl.
*H04N 7/01* (2006.01)
*H04N 11/20* (2006.01)
(52) U.S. Cl. .................... 348/448; 348/441; 348/459
(58) Field of Classification Search .......... 348/441–459, 348/552–570
See application file for complete search history.

(56) References Cited

U.S. PATENT DOCUMENTS

7,899,250 B2 * 3/2011 Huang et al. ............... 382/176
2007/0296858 A1 * 12/2007 Eymard et al. ............. 348/456
* cited by examiner

*Primary Examiner* — Michael Lee
(74) *Attorney, Agent, or Firm* — Thomas, Kayden, Horstemeyer & Risley, LLP (57) ABSTRACT

A video processor receives an interlaced video comprising source video content and video overlay content. A progressive video of the received interlaced video is used for video overlay detection. The received interlaced video is deinterlaced and converted to a high frame-rate progressive video for display. Video overlay detection and frame based cadence detection are performed independently during frame-rate conversion. Candidate cadences are detected for each video frame. Decisions on final cadences for each video frame are made based on the detected candidate cadences and the detected video overlay content. A frame-rate upconversion is performed according to the final cadence detection decisions. Video frame differences between each video frame and associated adjacent video frames are generated for video overlay detection. Pixel values per line are integrated for each generated video frame difference. An overlay detection vector is formed for each video frame via an element-wise min-operation and refined temporally and/or spatially.

26 Claims, 8 Drawing Sheets

METHOD AND SYSTEM FOR VIDEO OVERLAY ON FILM DETECTION ON PROGRESSIVE VIDEO INPUT

CROSS-REFERENCE TO RELATED APPLICATIONS/INCORPORATION BY REFERENCE

Not Appliable.

FIELD OF THE INVENTION

Certain embodiments of the invention relate to video processing. More specifically, certain embodiments of the invention relate to a method and system for video overlay on film detection on progressive video input.

BACKGROUND OF THE INVENTION

Most consumer video is captured in two video fields, even fields and odd fields, per video frame. An even field comprises the pixel information only for even lines, while the odd field comprises pixel information only for odd lines. The adjacent odd and even fields are interlaced with each other so as to remove objectionably perceptible flicker from display on various display devices such as, for example, a TV, a computer monitor and a projector.

A display device may be operable to display the content of the captured video using either a progressive display technique or an interlaced display technique. The progressive display technique displays both even and odd fields per video frame, simultaneously. The interlaced display technique displays one field after the other subsequently. Different display devices may use different display techniques. For example, to display contents of the captured video, a computer monitor may utilize the progressive display technique, while an interlaced television may utilize the interlaced technique.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for video overlay on film detection on progressive video input, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for video overlay on film detection on progressive video input. In various embodiments of the invention, a video processor is operable to receive an interlaced video comprising source video content and video overlay content. The video processor may be operable to detect the received video overlay content using a corresponding progressive video of the received interlaced video. In this regard, the video processor may be operable to deinterlace the received interlaced video producing the corresponding progressive video. The progressive video may be converted to a high frame-rate progressive video for display. Video overlay detection and frame based cadence detection may be performed independently during frame-rate conversion within a frame-rate converter of the video processor. The frame-rate converter may be operable to detect one or more candidate cadences for each video frame of the progressive video. The frame-rate converter may be operable to determine one or more final cadences for each video frame of the progressive video based on the detected one or more candidate cadences and the detected video overlay content. The frame-rate upconversion for the progressive video may be performed according to the determined one or more final cadences for each video frame. The frame-rate converter may be operable to generate video frame differences between each video frame and associated adjacent video frames of the progressive video for video overlay on film detection. The frame-rate converter may be operable to integrate pixel values per line for each generated video frame differences. An initial video overlay detection vector may be formed for each video frame by performing an element-wise min-operation on resulting integrations. The formed initial video overlay detection vector may be refined temporally and/or spatially.

Figure 1:
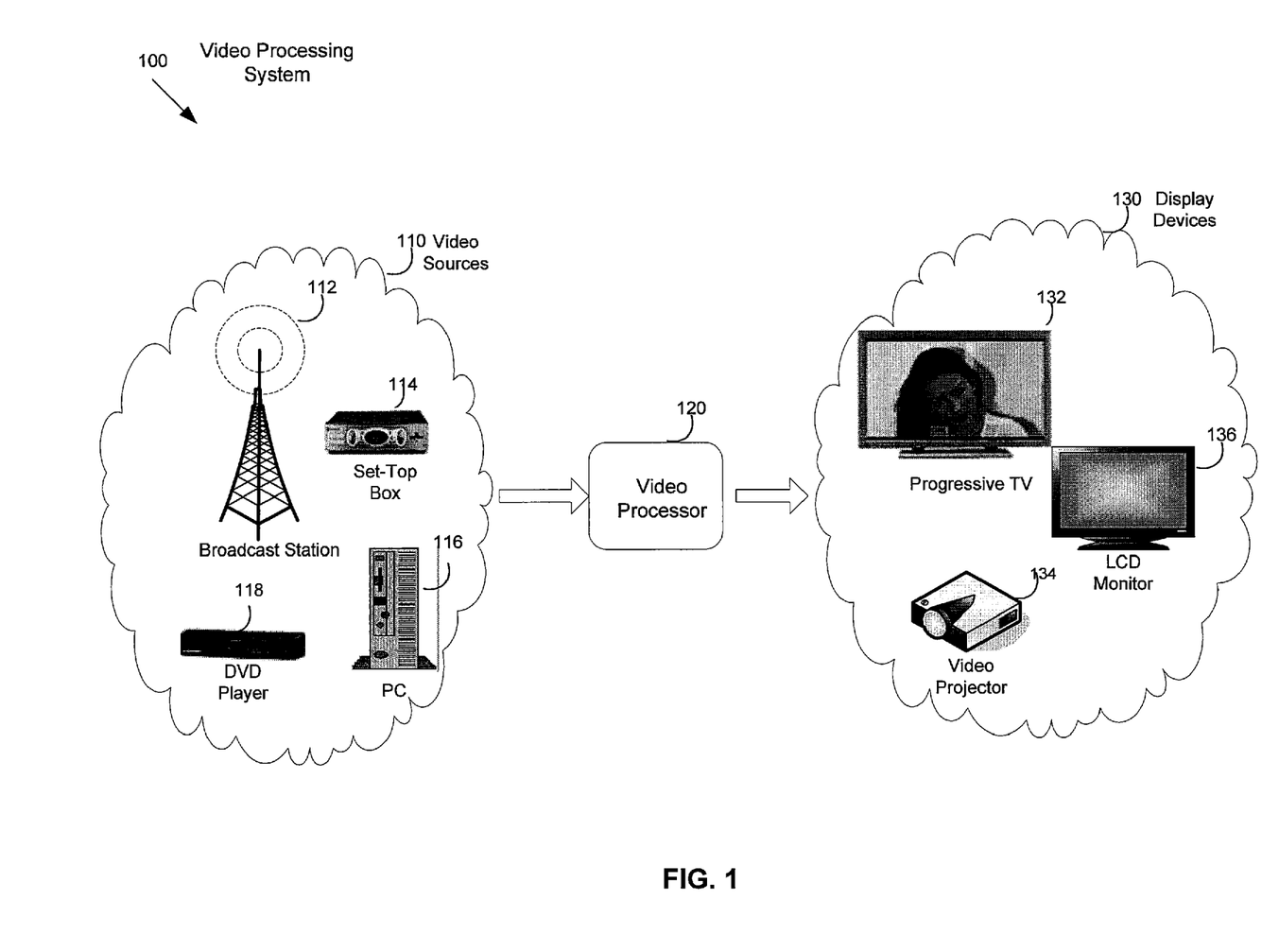
FIG. 1 is a block diagram of an exemplary video processing system that is operable to perform video overlay on film detection on progressive video data, in accordance with an embodiment of the invention.

FIG. 1 is a block diagram of an exemplary video processing system that is operable to perform video overlay on film detection on progressive video data, in accordance with an embodiment of the invention. Referring to FIG. 1, there is shown a video processing system 100. The video processing system 100 comprises video sources 110, a video processor 120, and display devices 130. The video sources 110 may comprise a plurality of video devices, of which a broadcast station 112, a set-top box 114, a PC 116, and a DVD player 118 are displayed. The display devices 130 may comprise a plurality of display devices, of which a progressive TV 132, a video projector 134, and a LCD monitor 136 are illustrated.

The video sources 110 may comprise suitable logic, circuitry, interfaces and/or code that may be operable to provide video content for display. The video content may be film-originated and/or video-originated. The video sources 110 may be operable to capture a source video from a remote video source in even fields and odd fields per video frame. The even fields and odd fields in each video frame may be interlaced with each other producing an interlaced source video for display. In this regard, the video sources 110 may be operable to locally add one or more additional video to the interlaced source video to be displayed. The one or more locally added additional video is referred to as video overlays. A video overlay may comprise information related to content of the captured source video, both directly and indirectly. For example, a video device such as the set-top box 114 may be operable to capture a source video from satellite broadcast in interlaced scan format. The set-top box 114 may be capable of providing an onscreen guide (a video overlay) with information on the captured source video. For example, the onscreen guide may comprise a title, scheduled time, channel, description, or other information related to the content of the captured source video. The set-top box 114 may be operable to add the onscreen guide to the captured source video to be displayed on the display devices 130. Another example, the broadcast station 112 may be operable to edit or overlay video by adding breaking news, weather and/or stock information (video overlays) to the captured source video such as a movie or commercial. The breaking news, weather and/or stock information may be scrolling at the bottom of the movie or commercial when displaying on the display devices 130.

The video processor 120 may comprise suitable logic, circuitry, interfaces and/or code that may be operable to process video content received from, for example, the set-top box 114, for display on a display device such as the progressive TV 132. The video processor 120 may be internally integrated inside the progressive TV 132 or the set-top box 114, and/or externally coupled or connected to the progressive TV 132 or the set-top box 114. The received video content may comprise interlaced source video content and embedded video overlay content. The received interlaced source video content may be film-originated and/or video-originated. The video processor 120 may be operable to deinterlace the received video content producing a progressive (non-interlaced) video for further video processing such as frame based cadence detection (FrameCD). Alternatively, the progressive (non-interlaced) video may also be provided by, for example, the set-top box 114 and/or the DVD player 118 to the video processor 120 depending on implementation. In this regard, the video processor 120 may be operable to identify the de-interlaced source video content and the embedded video overlay content on the progressive video data. The processor 120 may be operable to detect the de-interlaced source video content as film-originated video content. The video processor 120 may be operable to detect the embedded video overlay content in a video frame by analyzing video data in the video frame and corresponding adjacent video frames. The video processor 120 may be operable perform video overlay on film detection for various kinds of frame based cadences such as, for example, 3:2, 2:2, 5:5, 6:4, and 8:7. For example, the video processor 120 may be operable to detect a scrolling video overlaid on film background with frame cadences such as 3:2, 2:2, 5:5, 6:4, and 8:7. The video processor 120 may be operable to perform video overlay on film detection independently from frame based cadence detection or as a part of the frame based cadence detection depending on implementation.

The display devices 130 may comprise suitable logic, circuitry, interfaces and/or code that may be operable to display progressive video content received from the video processor 120. The received video content may comprise source video content and video overlay content. The received video content may be film-originated video content and/or video-originated video content.

In an exemplary operation, a video source such as the broadcast station 112 may be operable to capture a source video in interlaced scan format. A video overlay such as a breaking news and/or stock information may be added or embedded to the captured interlaced source video such as a movie or commercial. The resulting superimposed video may be provided to the video processor 120 for further video procession. The video processor 120 may be operable to deinterlace the superimposed video from the broadcast station 112 producing a progressive video. For each video frame of the progressive video, the video processor 120 may be operable to analyze video data in adjacent video frames so as to detect the de-interlaced source video content and the embedded video overlay content. The embedded video overlay content may be detected as either video content or film content. The video processor 120 may be operable to perform video overlay on film detection independently from frame based cadence detection, for example. The video overlay on film detection may be implemented for various kinds of cadences such as, for example, 3:2, 2:2, 5:5, 6:4, and 8:7.

Figure 2:
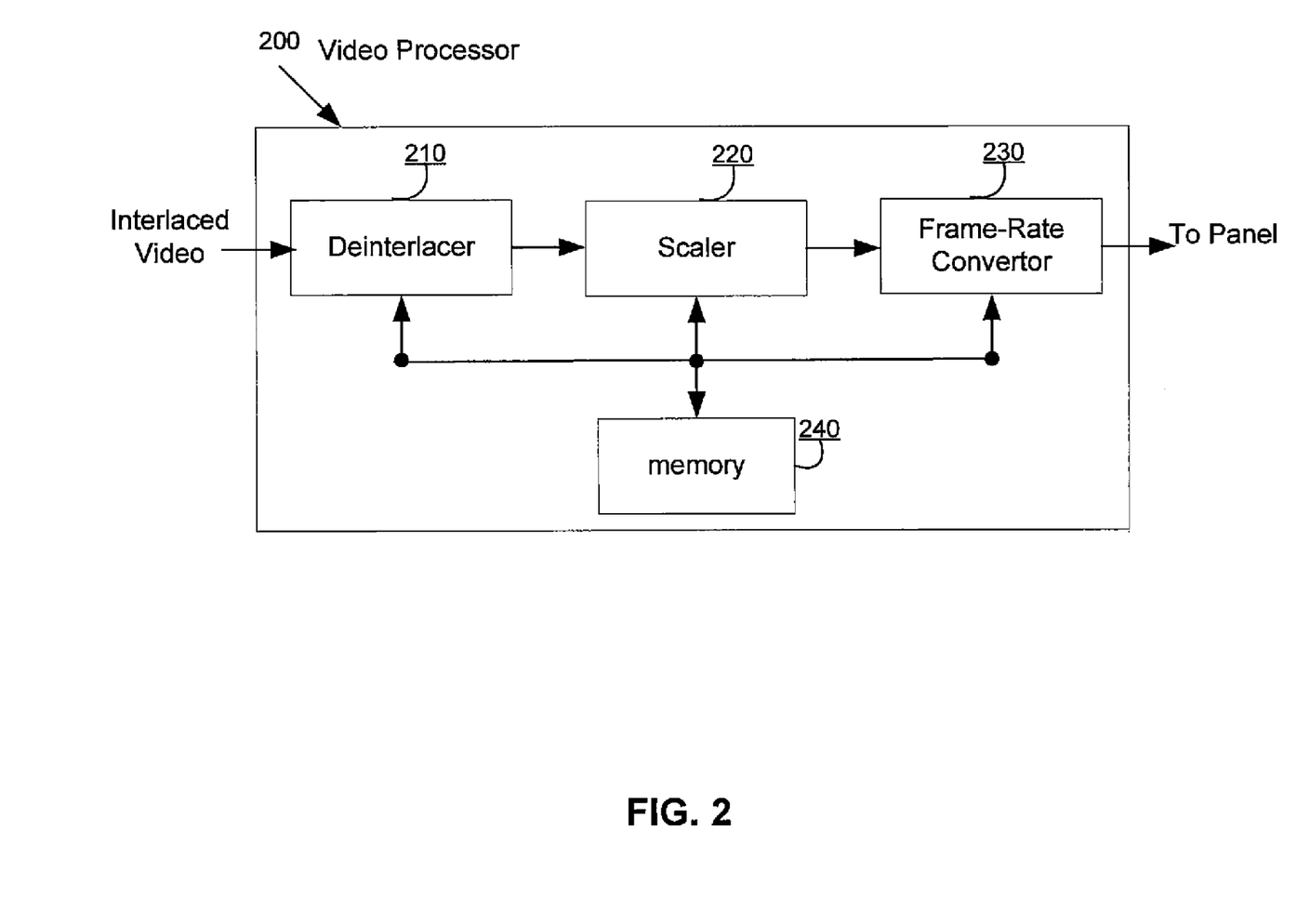
FIG. 2 is a diagram illustrating an exemplary video processor that is operable to perform video overlay on film detection on progressive video data, in accordance with an embodiment of the invention.

FIG. 2 is a diagram illustrating an exemplary video processor that is operable to perform video overlay on film detection on progressive video data, in accordance with an embodiment of the invention. Referring to FIG. 2, there is shown a video processor 200. The video processor 200 comprises a deinterlacer 210, a scaler 220, a frame rate converter (FRC) 230 and a memory 240.

The deinterlacer 210 may comprise suitable logic, circuitry, interfaces and/or code that may be operable to convert an interlaced video received from a video source such as the DVD player 118 to a progressive video. For example, the deinterlacer 210 may be operable to convert a 30 Hz interlaced video to a 60 Hz progressive video. This may eliminate or remove objectionably perceptible flicker from display and may also double the amount of perceptible details in each video frame.

The scaler 220 may comprise suitable logic, circuitry, interfaces and/or code that may be operable to match the resolution of a progressive video from the deinterlacer 210 to a desired resolution for a particular display device such as, for example, the progressive TV 132. For example, the scaler 220 may be operable to receive a progressive video with a low 480p resolution. The 480p resolution progressive video may be scaled into a 1080p resolution progressive video to be displayed on a display device such as the progressive TV 132.

The FRC 230 may comprise suitable logic, circuitry, interfaces and/or code that may be operable to up-convert video frame rate of a progressive video received from the scaler 120 to provide high picture quality results on a display device such as the progressive TV 132. The received progressive video may comprise a deinterlaced source video and one or more video overlays. In this regard, for each video frame of the received progressive video, the FRC 230 may be operable to analyze corresponding adjacent video frames to detect the deinterlaced source video and the one or more video overlays. In this regard, the FRC 230 may be operable to detect the de-interlaced source video content as film-originated video content and to detect the video overlay as either video content or film content. The FRC 230 may be operable to perform video overlay on film detection for various kinds of cadences such as, for example, 3:2, 2:2, 5:5, and 6:4. The video overlay on film detection may be performed independently from or as part of frame based cadence detection depending on implementation. The FRC 230 may be operable to convert the received progressive video to a higher frame-rate progressive video for display. For example, in instances where the received progressive video may be a 60 Hz video, the FRC 230 may be operable to convert the received progressive video to a higher frame-rate such as 120 Hz and/or 240 z progressive video for display. The FRC 230 may be operable to utilize various frame-rate up-conversion algorithms such as motion compensated frame-rate up-conversion (MC-FRC) algorithms to construct a higher frame-rate progressive video for display.

The memory 240 may comprise suitable logic, circuitry, interfaces and/or code that may be operable to store information such as executable instructions and data that may be utilized by the video processor 200. The executable instructions may comprise algorithms for frame-rate up-conversion, video overlay on film detection and/or frame based cadence detection that may be utilized by the FRC 230. The data may comprise video data and/or video overlay information. The data may comprise interpolated video frames constructed by the FRC 230 for display on a display device such as the progressive TV 132. The memory 240 may comprise RAM, ROM, disk drives, internal devices, external devices, network attached storage, low latency nonvolatile memory such as flash memory and/or other suitable electronic data storage.

In an exemplary operation, the deinterlacer 210 may be operable to receive an interlaced video from the video sources 110. The received interlaced video may comprise interlaced video content originated from film and edited with video overlay. The deinterlacer 210 may be operable to convert the received interlaced video to a corresponding progressive video to be provided to the scaler 220. The scaler 220 may be operable to match the resolution of the progressive video to a specific resolution required by a display device such as, for example, the progressive TV 132. For each video frame of the progressive video, the FRC 230 may be operable to analyze corresponding adjacent video frames to detect the deinterlaced source video content and the video overlay content. The de-interlaced source video content may be detected as film-originated video content, while the video overlay content may be detected as either video-originated video content or film-originated video content, respectively. The video overlay on film detection may be performed independently from frame based cadence detection. The video overlay on film detection may be performed on various kinds of cadences such as, for example, 3:2, 2:2, 5:5, 6:4 and 8:7. The FRC 230 may be operable to convert the received progressive video to a higher frame-rate such as 120 Hz or 240 Hz, progressive video to achieve a high quality display on the progressive TV 132.

Figure 3:
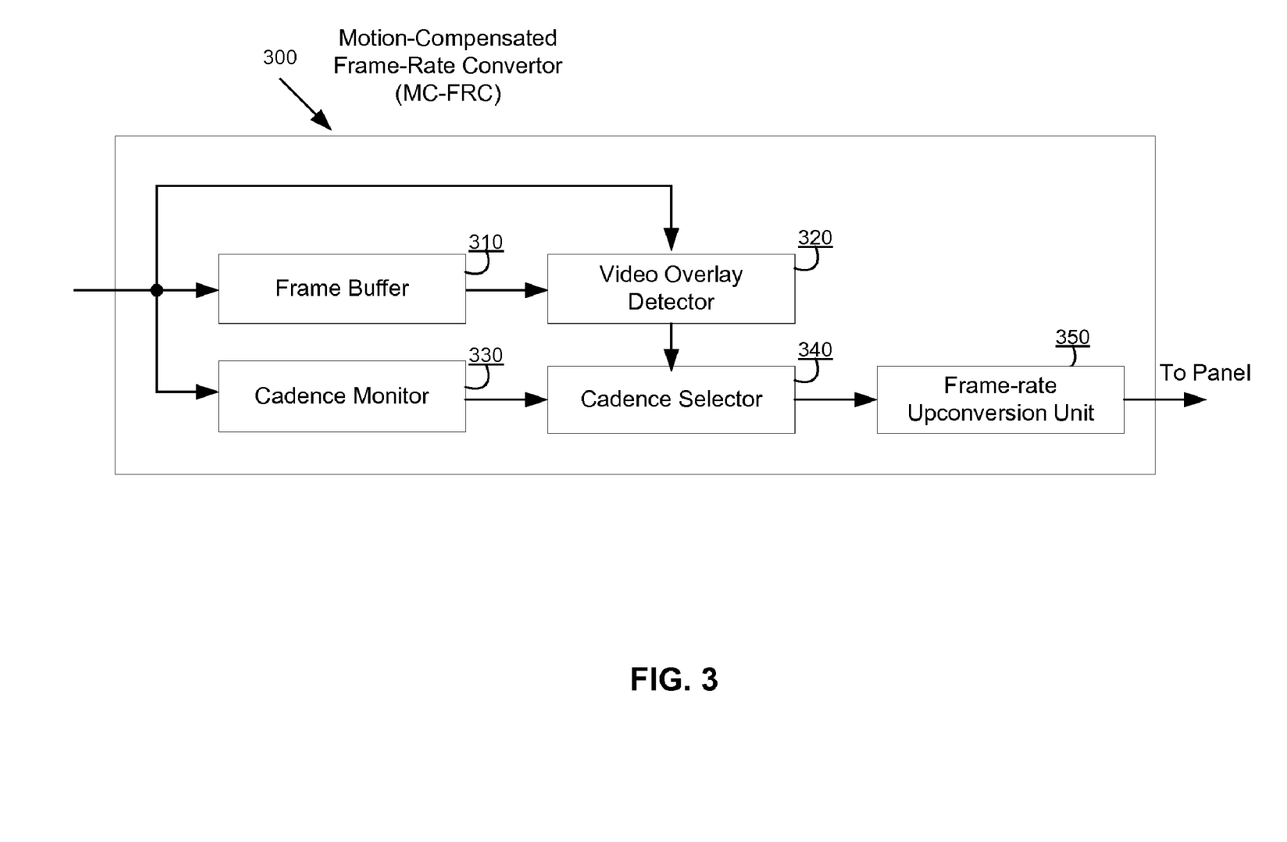
FIG. 3 is a diagram illustrating a motion-compensated frame rate converter that is operable to support video overlay on film detection on progressive video data, in accordance with an embodiment of the invention.

FIG. 3 is a diagram illustrating a motion-compensated frame rate converter that is operable to support video overlay on film detection on progressive video data, in accordance with an embodiment of the invention. Referring to FIG. 3, there is shown a motion-compensated frame-rate converter (MC-FRC) 300. The MC-FRC 300 comprises a frame buffer 310, a video overlay detector 320, a cadence monitor 330, a cadence selector 340 and a frame-rate upconversion module 350.

The frame buffer 310 may comprise suitable logic, circuitry, interfaces and/or code that may be operable to buffer or store progressive video frames from the scaler 220. The buffered video frames may comprise source video content and video overlay content. The frame buffer 310 may be operable to store a plurality of progressive video frames to be used for video overlay on film detection. The frame buffer 310 may be operable to provide compensation for delay variations that may occur in the progressive video frames received from the scaler 220. The size of the frame buffer 310 may depend on, for example, the maximum tolerated delay of the video processing system 100 and/or a packet loss rate of associated service. An optimal design for the frame buffer 310 may be implemented with one video frame capacity at no extra cost by sharing memory capacity with cadence detection and/or FRC.

The video overlay detector 320 may comprise suitable logic, circuitry, interfaces and/or code that may be operable to perform video overlay on film detection. The video overlay detector 320 may be operable to use progressive video frames stored in the frame buffer 310 for video overlay on film detection. For each progressive video frame, the video overlay detector 320 may be operable to analyze corresponding adjacent video frame or frames stored in the frame buffer 310 for detecting the video overlay content. In this regard, the video overlay content may be detected by evaluating the video frame differences between a targeted video frame and corresponding adjacent video frames. The video frame differences may be evaluated in various ways such as via a line accumulation for video overly on film detection. The video overlay on film detection may be performed independently from frame cadence detection. The video overlay detect 320 may be operable to implement video overlay on film detection for various kinds of cadences such as, for example, 3:2, 2:2, 5:5, 6:4, and 8:7.

The cadence monitor 330 may comprise suitable logic, circuitry, interfaces and/or code that may be operable to monitor video content of progressive video frames for frame cadences. The cadence monitor 330 may be operable to identify initial frame candidates in each progressive video frame without corresponding video overlay information. Various algorithms may be used for identifying candidate cadences in each of the progressive video frames. Information on the identified candidate cadences may be communicated with the cadence selector 340 for the final cadence determination for each video frame.

The cadence selector 340 may comprise suitable logic, circuitry, interfaces and/or code that may be operable to make final decision on the final cadences in each video frame based on the identified candidate cadences and the detected video overlay information.

The frame-rate upconversion module 350 may comprise suitable logic, circuitry, interfaces and/or code that may be operable to up-convert a progressive video based on the information provided by the cadence selector 340 to a higher frame-rate such as 120 Hz or 240 Hz progressive video to be displayed on a display device such as the progressive TV 132. The frame-rate upconversion module 350 may be operable to generate a plurality of interpolated video frames for the frame-rate upconversion according to the final determined frame based cadences in the cadence selector 340.

In an exemplary operation, the MC-FRC 300 may be operable to receive a progressive video from the scaler 220. The received progressive video may be monitored per frame for frame cadence detection via the cadence monitor 330. Various algorithms may be used to identify candidate frame cadences in each video frame of the received progressive video. Information on the identified candidate frame cadences may be communicated with the cadence selector 340 for final determination on the frame cadence. The received video frames may also be buffered or stored in the frame buffer 310. The stored video frames of the received progressive video may be utilized by the video overlay detector 320 for video overlay on film detection. Information on the detected video overlay content may be communicated with the cadence selector 340. The cadence selector 340 may be operable to make a final decision on the frame cadence per frame based on corresponding frame candidate cadence information and detected video overlay content information. The received progressive video may be converted into a higher frame-rate progressive video to be provided to one or more panels for display.

Figure 4:
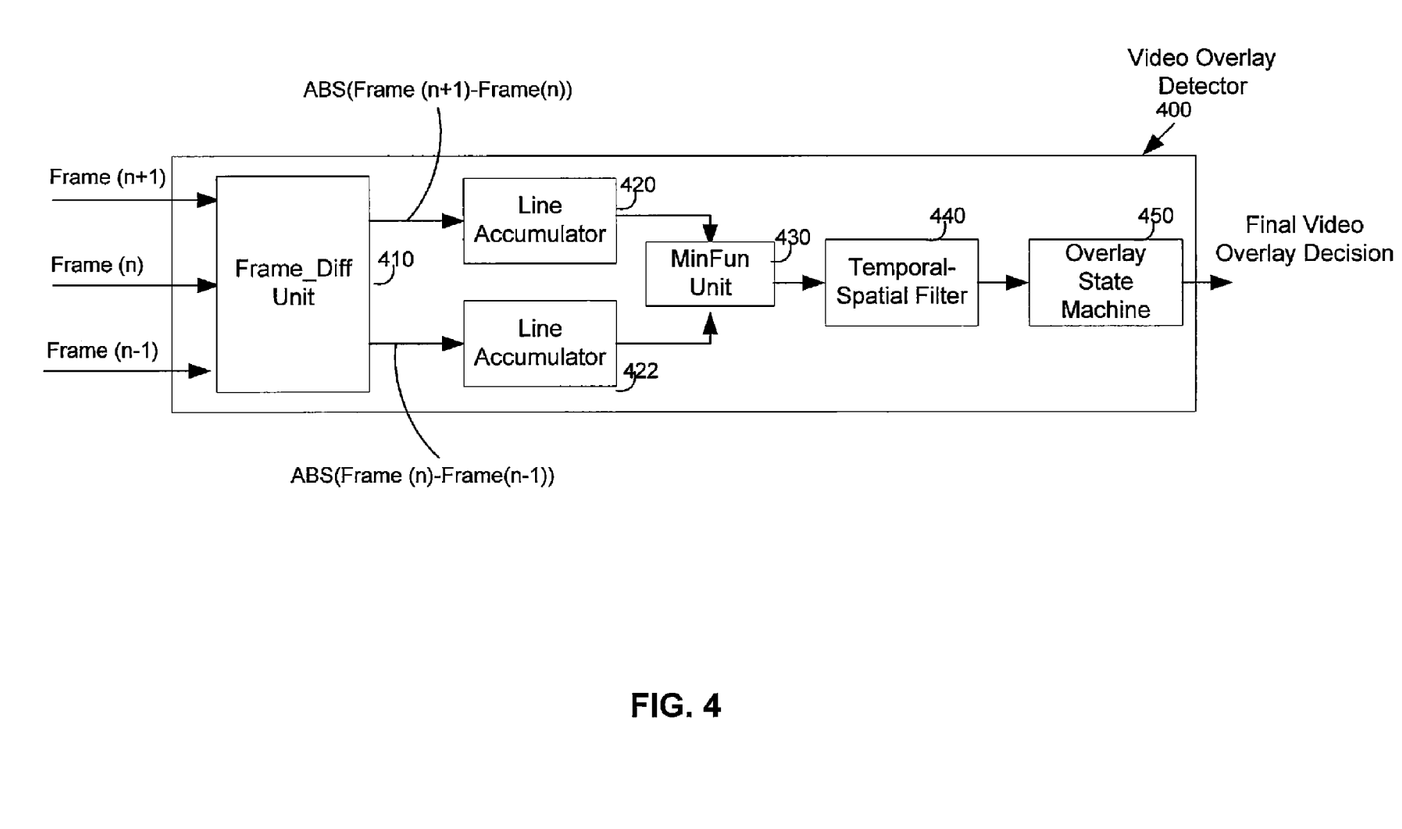
FIG. 4 is a diagram illustrating an exemplary video overlay detector that is operable to perform video overlay on film detection on progressive video data, in accordance with an embodiment of the invention.

FIG. 4 is a diagram illustrating an exemplary video overlay detector that is operable to perform video overlay on film detection on progressive video data, in accordance with an embodiment of the invention. Referring to FIG. 4, there is shown a video overlay detector 400. The video overlay detector 400 comprises a frame_diff unit 410, line accumulators 420 and 422, a minFun module 430, a temporal-spatial filter 440 and an overlay state machine 450.

The frame_diff 410 may comprise suitable logic, circuitry, interfaces and/or code that may be operable to calculate video frame differences between each video frame and associated adjacent video frames of a progressive video. For example, in instances where frame(n−1), frame(n), and frame(n+1) indicate video frames at time events n−1, n, and n+1, respectively, where $0 \leq n \leq$ total number of video frames of the progressive video, for frame(n), the frame-diff 410 may be operable to produce abs(frame(n+1)-frame(n)) and abs(frame(n)-frame(n−1)), respectively. The resulting two video frame differences may be provided to line accumulators 420 and 422, respectively, for video overly on film detection.

The line accumulators 420 and 422 may comprise suitable logic, circuitry, interfaces and/or code that may be operable to accumulate pixels line-by-line for the two video frame differences, respectively. In this regard, the line accumulators 420 and 422 may accumulate pixels with a pixel value greater than a pre-determined pixel threshold, for example. Depending on implementation, the line accumulators 420 and 422 may be operable to perform accumulation on pixel value differences or pixel value differences greater than a predetermined threshold across the whole line. The pre-determined pixel threshold value may be related to characteristics of corresponding video overlay content. A low accumulation number (less than the pre-determined pixel threshold value) may indicate video content associated with a corresponding row may be film-originated video content. A high accumulation number (greater than the pre-determined pixel threshold value) may indicate video content associated with a corresponding row may be video-originated video content. The line accumulators 420 and 422 may provide video overlay information per line and/or per frame. For example, a line accumulation number for a particular line may indicate video overlay information on the particular line. A line accumulation number over an entire video frame may indicate video overlay information on the video frame.

The minFun module 430 may comprise suitable logic, circuitry, interfaces and/or code that may be operable to apply an element-wise min function to the outputs of the line accumulators 420 and 422. The resulting element-wise minimum values may form an initial video overlay detection vector. The minFun module 430 may be operable to provide an initial video overlay detection vector for each video frame. For example, for a video frame of frame(n), in instances where an output of the line accumulator 420 may be $$\begin{bmatrix} 0 \\ 4 \\ 0 \end{bmatrix}$$

and an output of the line accumulator 422 may be $$\begin{bmatrix} 4 \\ 4 \\ 4 \end{bmatrix},$$

the minFun module 430 may be operable to produce an initial video overlay detection vector for the video frame frame(n) by $$minFun\left(\begin{bmatrix} 0 \\ 4 \\ 0 \end{bmatrix}, \begin{bmatrix} 4 \\ 4 \\ 4 \end{bmatrix}\right) = \begin{bmatrix} 0 \\ 4 \\ 0 \end{bmatrix}.$$

The element values in the produced initial video overlay detection vector, $$\begin{bmatrix} 0 \\ 4 \\ 0 \end{bmatrix},$$

may indicate video content types such as video-originated or film-originated video content. For example, for the initial video overlay detection vector of $$\begin{bmatrix} 0 \\ 4 \\ 0 \end{bmatrix},$$

a higher element value of 4 may indicate that video overlay content may be detected on the row 2 and video content on the row 1 and row 3 may be film-originated video content.

The temporal-spatial filter 440 may comprise suitable logic, circuitry, interfaces and/or code that may be operable to reduce noise on initial video overlay detection vectors produced by the minFun module 430. The temporal-spatial filter 440 may be operable to check the spatial and temporal consistency on initial video overlay detection vectors.

The overlay state machine 450 may comprise suitable logic, circuitry, interfaces and/or code that may be operable to provide final decision on video overlay on film detection for each video frame of a progressive video. The overlay state machine 450 may be driven by consistence statistics of initial video overlay detection indicated over successive video frames.

In an exemplary operation, the frame-diff unit 410 of the video overlay detector 400 may be operable to produce video frame differences between a specific video frame and associated adjacent video frames. For example, for a video frame of frame(n), the frame-diff unit 410 may be operable to produce abs(frame(n+1)-frame(n)) and abs(frame(n)-frame(n−1)), respectively. The resulting video frame difference may be provided to the line accumulators 420 and 422, respectively.

The line accumulators 420 and 422 may be operable to perform line accumulation on pixels with values greater than a pre-determined threshold. The minFun module 430 may be operable to apply an element-wise minimum function to the outputs of the line accumulators 420 and 422 to produce initial video overlay detection for frame(n). The initial video overlay detection for frame(n) may be temporally and spatially filtered via the temporal-spatial filter 440 for consistent and reliable video overlay detection. The initial video overlay detection of frame(n) may be further evaluated via the overlay state machine in successive video frames for final decision on video overlay detection.

Figure 5:
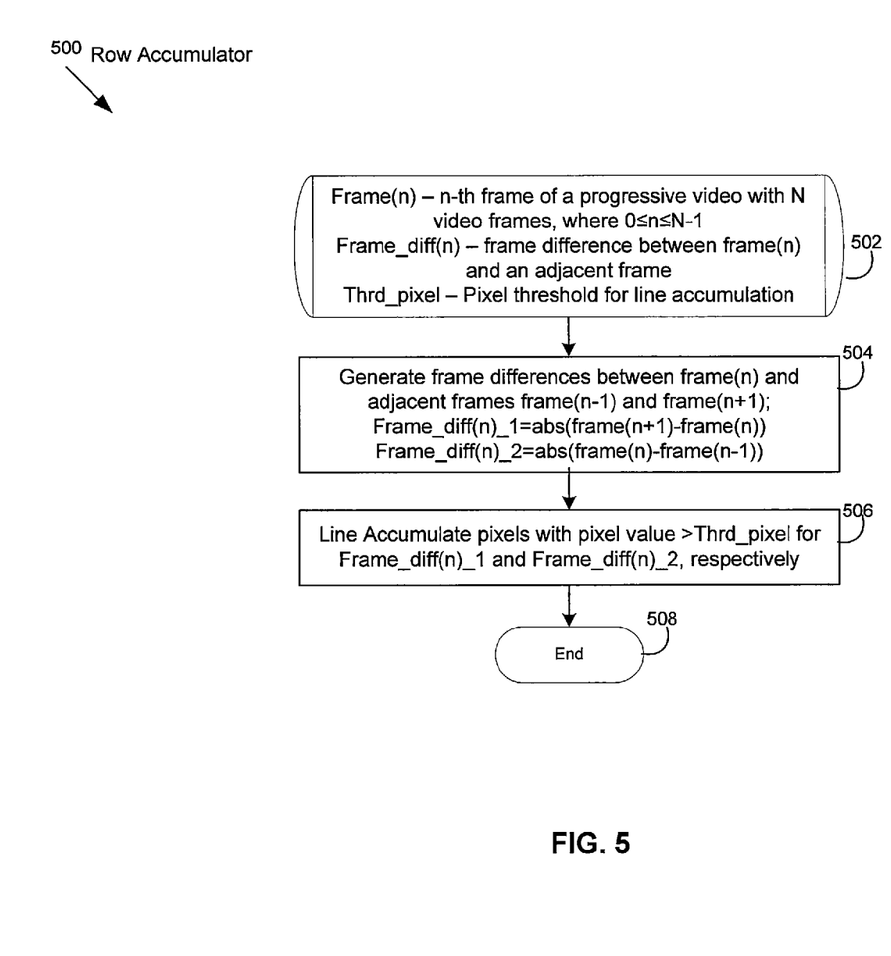
FIG. 5 is a flow chart illustrating exemplary steps for performing line accumulation for video overlay on film detection on progressive video data, in accordance with an embodiment of the invention.

FIG. 5 is a flow chart illustrating exemplary steps for performing line accumulation 500 for video overlay on film detection on progressive video data, in accordance with an embodiment of the invention. Referring to FIG. 5, the exemplary steps start with step 502, where frame(n) is an n-th video frame of a progressive video with total N video frames, where $0 \leq n \leq N-1$. Frame_diff(n) represents video frame difference between frame(n) and an associated adjacent video frame such as frame (n−1) or frame(n+1). Thrd_pixel is a pixel threshold for line accumulation. In step 504, the frame_diff unit 410 may be operable to generate frame differences between frame(n) and adjacent frames frame(n−1) and frame (n+1), respectively. Namely, Frame_diff(n)_1=abs(frame (n+1)-frame(n)) and Frame_diff(n)2=abs(frame(n)-frame (n−1)). In step 506, the line accumulator 420 may be operable to perform line accumulation over pixels with pixel value>Thrd_pixel of the generated Frame_diff(n)_1. The line accumulator 422 may be operable to perform line accumulation over pixels with pixel value>Thrd_pixel of the generated Frame_diff(n)_2. The resulting outputs of the line accumulators 420 and 422 may be communicated with the minFun module 430 for initial video overlay detection. The exemplary steps stop in step 508.

Figure 6:
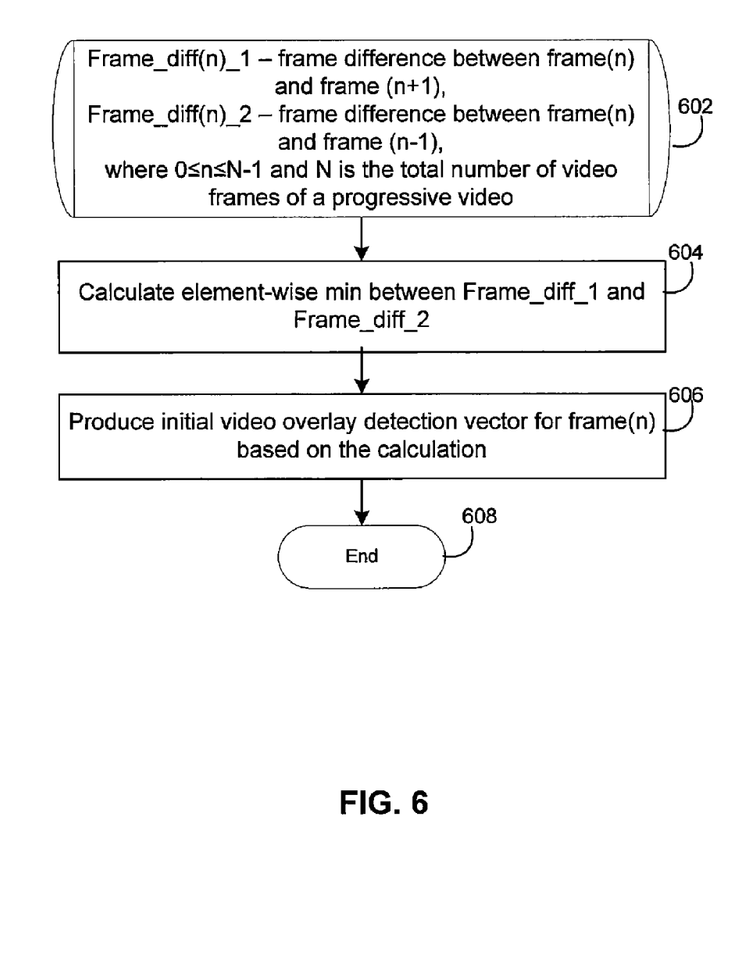
FIG. 6 is a flow chart illustrating exemplary steps for generating initial video overlay on film detection on progressive video data, in accordance with an embodiment of the invention.

FIG. 6 is a flow chart illustrating exemplary steps for generating initial video overlay on film detection on progressive video data, in accordance with an embodiment of the invention. Referring to FIG. 6, the exemplary steps start with step 602, where frame_diff(n)_1 represents video frame difference between frame(n) and frame(n+1). Frame_diff(n)_2 represents video frame difference between frame(n) and frame(n−1). Parameter n is the frame index and $0 \leq n \leq N-1$, where N is the total number of video frames of a progressive video. In step 604, the minFun module 430 may be operable to calculate element-wise min between Frame_diff_1 and Frame_diff_2. In step 606, the minFun module 430 may be operable to produce initial video overlay detection vector for the video frame of frame(n) based on the calculation. The exemplary steps end at step 608.

Figure 7:
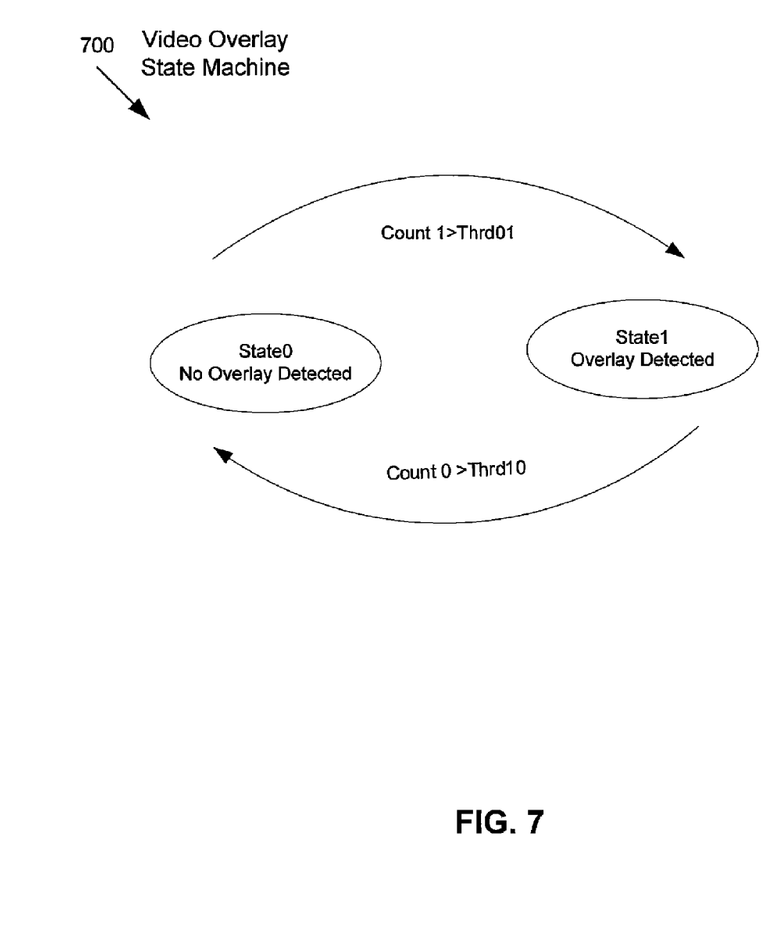
FIG. 7 is a state diagram illustrating exemplary steps for generating final video overlay on film detection on progressive video data, in accordance with an embodiment of the invention.

FIG. 7 is a state diagram illustrating exemplary steps for generating final video overlay on film detection on progressive video data, in accordance with an embodiment of the invention. Referring to FIG. 7, there is shown a video overlay state machine with a state 0 and a state 1.

In the state 0, the overlay state machine 700 may be in a state that no video overlay is detected in a current video frame of a progressive video. In state 1, the overlay state machine 700 may be in a state that a video overlay is detected in a current video frame of the progressive video.

The overlay state machine 700 may transition between the state 0 and state 1 according to initial video overlay detection information over consecutive video frames of the progressive video. The overlay state machine 700 may be reset and start with the state 0. The overlay state machine 700 may be operable to transition to the state 1 from the state 0 when video overlay content may be detected over at least thred01 consecutive video frames, the parameter thred01 is a count threshold for state transmission from the state 0 to the state 1.

In the state 1, the state overlay state machine 700 may stay in the state 1 when the video overlay content may not be detected over at least thred10 consecutive video frames, the parameter thred10 is a count threshold for state transmission from the state 0 to the state 1.

Figure 8:
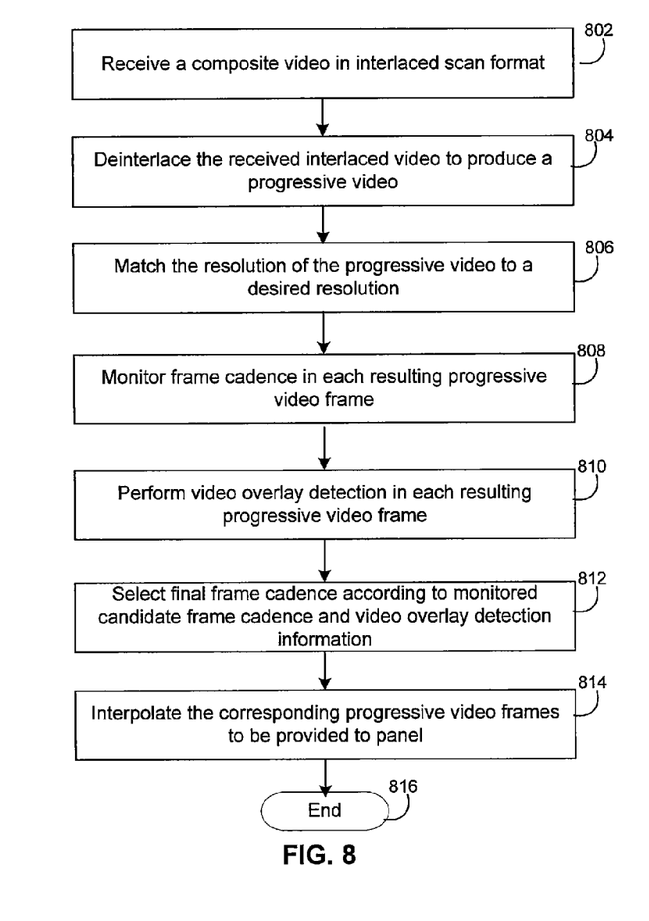
FIG. 8 is a flow chart illustrating exemplary steps for performing video overlay on film detection on progressive video data, in accordance with an embodiment of the invention.

FIG. 8 is a flow chart illustrating exemplary steps for performing video overlay on film detection on progressive video data, in accordance with an embodiment of the invention. Referring to FIG. 8, the exemplary steps start with step 802, where the video processor 200 may be operable to receive a superimposed video in interlaced scan format. In step 804, the video processor 200 may be operable to deinterlace via the deinterlacer 210 the received interlaced video producing a progressive video. In step 806, the scaler 220 may be operable to match the resolution of the progressive video to a specific resolution, which may be required or desired by a display device such as the progressive TV 132. In step 808, the cadence monitor 330 may be operable to monitor frame cadence in each resulting progressive video frame from the scaler 220. In step 810, the frame buffer 310 may be operable to buffer progressive video frames from the scaler 220. The buffered progressive video frames may be used for video overlay on film detection in each progressive video frame. In step 812, the final frame cadence may be selected or determined according to candidate frame cadence information provided by the cadence monitor 330 and video overlay detection information provided by the video overlay detector 320, respectively. In step 814, the resulting video frames may be interpolated to be provided to one or more panels for display. The exemplary steps end at step 816.

Aspects of a method and system for video overlay on film detection on progressive video input are provided. In accordance with various embodiments of the invention, the video processor 200 may be operable to receive an interlaced video from a video source such as, for example, the broadcast station 112. The received interlaced video may comprise source video content and video overlay content. The video processor 200 may be operable to detect the received video overlay content using a corresponding progressive video of the received interlaced video. In this regard, the video processor 200 may be operable to deinterlace the received interlaced video via the deinterlacer 210 producing the corresponding progressive video. The produced progressive video may be scaled via the scaler 220 to a specific resolution progressive video according to display device configuration. The resulting progressive video may be communicated with the MC-FRC 300 for a high frame-rate progressive video for display. The MC-FRC 300 may be operable to use the progressive video to perform video overlay detection and frame cadence detection independently.

With regard to frame based cadence detection, the MC-FRC 300 may be operable to detect one or more candidate cadences for each video frame of the progressive video from the scaler 220. The cadence selector 340 in the MC-FRC 300 may be operable to determine one or more final cadences for each video frame of the progressive video based on the detected one or more candidate cadences and the detected video overlay content. The frame-rate upconversion module 350 may be operable to perform frame-rate upconversion for the progressive video according to the determined final one or more cadences for each video frame.

With regard to video overlay detection, the MC-FRC 300 may be operable to generate video frame differences between each video frame and associated adjacent video frames of the progressive video. As described with respect to FIG. 4 and FIG. 5, the line accumulators 420 and 422 may be operable to integrate pixel values, which are greater than a pre-determined threshold, per line for each generated video frame differences, respectively. As described with respect to FIG. 4 and FIG. 6, the minFun module 430 may be operable to form an initial video overlay detection vector for each video frame by performing an element-wise min-operation on resulting integrations from the line accumulator 420 and the line accumulator 422. The formed initial video overlay detection vector may provide initial video overlay detection information for the received video overlay content. The initial video overlay detection information may be refined using various mechanisms such as, for example, filtering via the temporal-spatial filter 440 and/or decision state transition controlling via the overlay state machine 450.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for video overlay on film detection on progressive video input.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising:
   receiving, in a video processing system, an interlaced video comprising source video content and video overlay content;
   detecting, in said video processing system, said received video overlay content using a progressive video corresponding to said received interlaced video;
   deinterlacing, in said video processing system, said received interlaced video for said progressive video;
   detecting, in said video processing system, one or more candidate cadences for each video frame of said progressive video after said deinterlacing; and
   determining one or more final cadences for each video frame of said progressive video based on said detected one or more candidate cadences and said detected video overlay content.

2. The method according to claim 1, comprising performing frame-rate upconversion for said progressive video according to said determined final one or more cadences for each video frame of said progressive video.

3. The method according to claim 1, comprising generating video frame differences between each video frame and associated adjacent video frames of said progressive video.

4. The method according to claim 3, comprising integrating pixel values per line for each of said generated video frame difference.

5. The method according to claim 4, comprising performing an element-wise minimum operation on said integrations.

6. The method according to claim 5, comprising detecting said received video overlay content based on said element-wise minimum operation.

7. The method according to claim 6, comprising refining said video overlay detection temporarily and spatially.

8. A system for video processing, the system comprising:
   one or more processors, one or more circuits, or combinations thereof configured to:
   receive an interlaced video comprising source video content and video overlay content;
   detect said received video overlay content using a progressive video corresponding to said received interlaced video;
   deinterlace said received interlaced video for said progressive video;
   detect one or more candidate cadences for each video frame of said progressive video after said deinterlacing; and
   determine one or more final cadences for each video frame of said progressive video based on said detected one or more candidate cadences and said detected video overlay content.

9. The system according to claim 8, wherein said one or more processors, one or more circuits, or combinations thereof are further configured to perform frame-rate upconversion for said progressive video according to said determined final one or more cadences for each video frame of said progressive video.

10. The system according to claim 8, wherein said one or more processors, one or more circuits, or combinations thereof are further configured to generate video frame differences between each video frame and associated adjacent video frames of said progressive video.

11. The system according to claim 10, wherein said one or more processors, one or more circuits, or combinations thereof are further configured to integrate pixel values per line for each of said generated video frame differences.

12. The system according to claim 11, wherein said one or more processors, one or more circuits, or combinations thereof are further configured to perform an element-wise minimum operation on said integrations.

13. The system according to claim 12, wherein said one or more processors, one or more circuits, or combinations thereof are further configured to detect said received video overlay content based on said element-wise minimum operation.

14. The system according to claim 13, wherein said one or more processors, one or more circuits, or combinations thereof are further configured to refine said video overlay detection temporarily and spatially.

15. A method for video processing, the method comprising:
- receiving, in a video processing system, an interlaced video comprising source video content and video overlay content;
- detecting, in said video processing system, said received video overlay content using a progressive video corresponding to said received interlaced video;
- deinterlacing, in said video processing system, said received interlaced video for said progressive video;
- generating, in said video processing system, video frame differences between each video frame and associated adjacent video frames of said progressive video;
- integrating pixel values per line for each of said generated video frame difference: and
- performing an element-wise minimum operation on said integrations.

16. The method according to claim 15, comprising detecting said received video overlay content based on said element-wise minimum operation.

17. The method according to claim 16, comprising refining said video overlay detection temporarily and spatially.

18. The method according to claim 15, comprising detecting one or more candidate cadences for each video frame of said progressive video after said deinterlacing.

19. The method according to claim 18, comprising determining one or more final cadences for each video frame of said progressive video based on said detected one or more candidate cadences and said detected video overlay content.

20. The method according to claim 19, comprising performing frame-rate upconversion for said progressive video according to said determined final one or more cadences for each video frame of said progressive video.

21. A system for video processing, the system comprising:
one or more processors, one or more circuits, or combinations thereof configured to:
- receive an interlaced video comprising source video content and video overlay content;
- detect said received video overlay content using a progressive video corresponding to said received interlaced video;
- deinterlace said received interlaced video for said progressive video;
- generate video frame differences between each video frame and associated adjacent video frames of said progressive video;
- integrate pixel values per line for each of said generated video frame differences; and
- perform an element-wise minimum operation on said integrations.

22. The system according to claim 21, wherein said one or more processors, one or more circuits, or combinations thereof are further configured to detect said received video overlay content based on said element-wise minimum operation.

23. The system according to claim 22, wherein said one or more processors, one or more circuits, or combinations thereof are further configured to refine said video overlay detection temporarily and spatially.

24. The system according to claim 21, wherein said one or more processors, one or more circuits, or combinations thereof are further configured to detect one or more candidate cadences for each video frame of said progressive video after said deinterlacing.

25. The system according to claim 24, wherein said one or more processors, one or more circuits, or combinations thereof are further configured to determine one or more final cadences for each video frame of said progressive video based on said detected one or more candidate cadences and said detected video overlay content.

26. The system according to claim 25, wherein said one or more processors, one or more circuits, or combinations thereof are further configured to perform frame-rate upconversion for said progressive video according to said determined final one or more cadences for each video frame of said progressive video.

* * * * *